March 26, 1940.  J. S. WOOD  2,195,159
BELT CENTERING DEVICE
Filed April 14, 1937    2 Sheets-Sheet 1
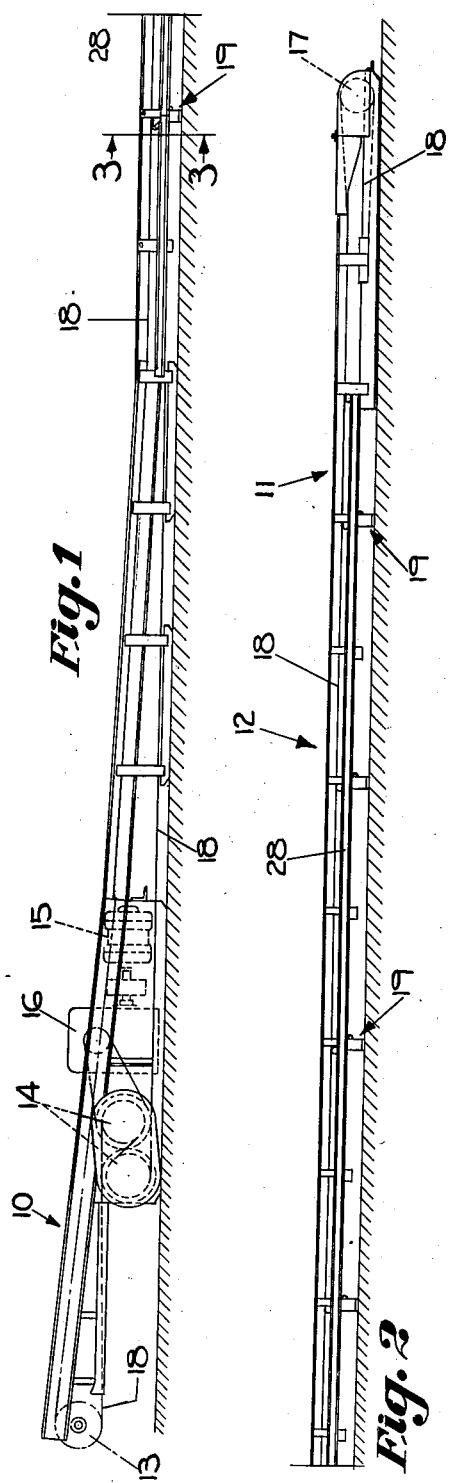
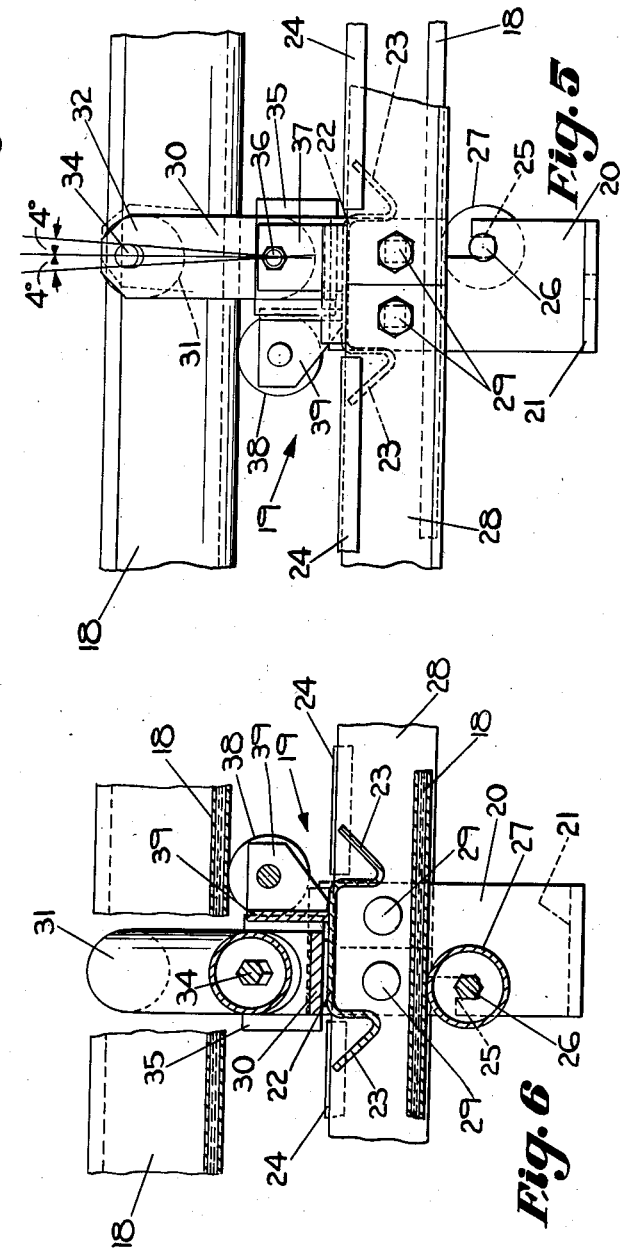
INVENTOR:
JOHN S. WOOD,
BY
Chas. M. Nissen,
ATTY.

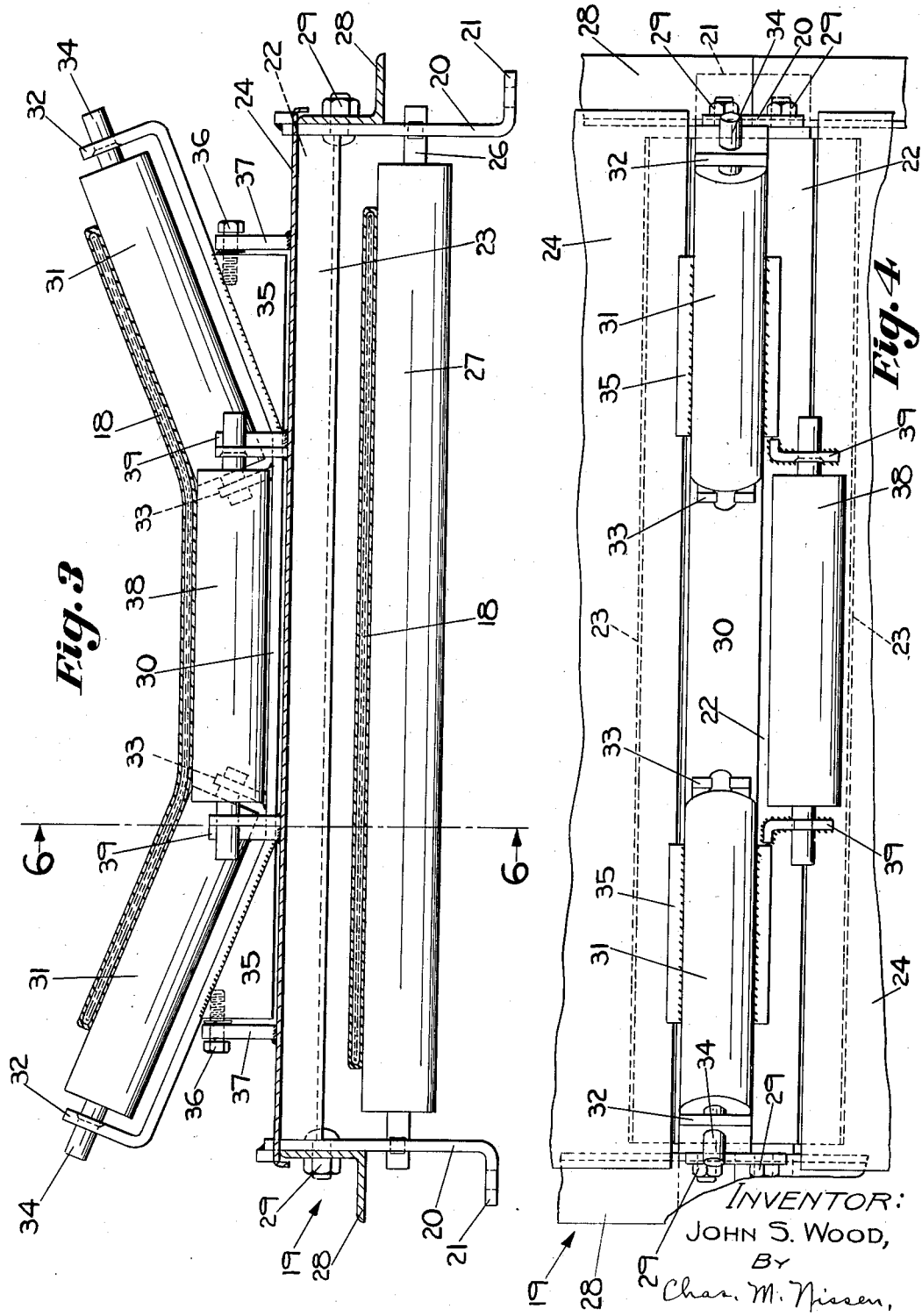

Patented Mar. 26, 1940

2,195,159

UNITED STATES PATENT OFFICE 2,195,159

BELT CENTERING DEVICE

John S. Wood, Huntington, W. Va., assignor to The Jeffrey Manufacturing Company, a corporation of Ohio Application April 14, 1937, Serial No. 136,839

11 Claims. (Cl. 198—202)

This invention relates to a belt centering device for a conveyor.

An object of the invention is to provide a belt conveyor with a belt centering device which is operative to maintain the belt in proper alignment regardless of the direction of travel of said belt.

Another object of the invention is to provide a belt centering or aligning device which will maintain a belt in proper alignment regardless of the direction of travel thereof.

Other objects of the invention will appear hereinafter, the novel features and combinations being set forth in the appended claims.

In the accompanying drawings:

Figs. 1 and 2, placed end to end illustrate a conveyor comprising my invention;

Fig. 3 is a transverse sectional elevational view taken on the line 3—3 of Fig. 1 and showing the belt centering device comprising my invention;

Fig. 4 is a plan view of the belt centering device of Fig. 3 with the belt omitted;

Fig. 5 is an end elevational view of the belt centering device of Figs. 3 and 4; and Fig. 6 is a sectional elevational view taken on the line 6—6 of Fig. 3 looking in the direction of the arrows.

Referring particularly to Figs. 1 and 2 of the drawings there is seen a trough type of belt conveyor particularly adapted for use in mines, such as coal mines, comprising a main frame formed by interconnected head section 10, tail section 11 and removable intermediate sections 12. The head section 10 is provided with a head pulley 13 and a pair of tandem drive pulleys 14 which are driven from a reversible type of electric motor 15 through a speed reducer 16. The tail section is provided with a tail pulley 17.

Extending continuously through the main frame of the conveyor and between the head pulley 13 and tail pulley 17, and reeved about the drive pulleys 14 is a continuous conveyor belt 18. The upper run of the belt 18 is formed in the shape of a trough by means hereinafter described in full detail. It will be evident that the reversible electric motor 15 may be operated to drive the belt 18 in either direction, but the normal mode of operation will be to drive said belt toward the head pulley 13. Special conditions frequently arise, however, particularly in a coal mine, where it is desirable to reverse the direction of travel of the belt 18.

It has been found in practice that due to the irregular surfaces which mine conveyors rest upon, it is necessary to provide some belt aligning or belt centering device to prevent undue wear on the belt 18. In general, however, these devices are not adapted to function upon a reversal of the normal direction of travel of the belt, but only function properly when the belt is driven in a single direction. The belt centering device comprising my invention is particularly constructed to maintain the belt in proper alignment or properly centered regardless of the direction of travel thereof. Said devices may be placed at suitable intervals along the conveyor, as illustrated in Figs. 1 and 2, and are designated generally by the reference character 19. Each of said belt centering devices comprises a pair of spaced side plates 20, 20 having feet 21, 21 and interconnected by a rigidly attached transversely extending inverted channel 22 provided with wings 23, 23 adapted to support spill plates 24 which prevent any material which might fall off the upper run of the belt 18 falling on the upper surface of the lower run thereof.

One of the plates 20 is provided with an aperture and the other with a bayonet slot 25, which aperture and bayonet slot receive, respectively, the opposite ends of the shaft 26 of idler roller 27 which supports the lower run of the belt 18.

It will be understood that the belt centering devices 19 form an integral part of the complete conveyor by virtue of their connection to the longitudinally extending angle members 28, 28 which form a part of the main frame of said conveyor. Said angle members 28, 28 are removably attached to the belt centering devices 19 by appropriate nuts and bolts 29, 29.

Pivotally mounted upon the inverted channel 22 is an idler roller supporting frame 30 which carries a pair of inclined idler rollers 31, 31 removably mounted thereupon by outer end brackets 32 and inner end brackets 33. The outer end brackets 32 are apertured to receive the shafts 34 of the idler rollers 31 and the inner end brackets 33 are slotted to receive flattened portions of said shafts 34 in a manner well understood in this art.

Extending downwardly from the inclined end portions of the roller supporting frame 30 is a pair of spaced counterweights 35 which counterbalance the supporting frame 30 and all the elements rigidly attached thereto, about a horizontal axis which passes through the pivotal axis thereof afforded by pivot bolts 36, 36 pivotally mounted upon brackets 37, 37 extending upwardly from the channel 22. Also supported by the channel 22 and rigidly attached thereto, is a central idler roller 38 mounted upon angularly formed end brackets 39, 39 which are welded rigidly to said channel 22.

From the above description it will be evident that the idler roller supporting frame 30 is pivoted for free pivotal or swinging movement about a horizontal axis passing through the bolts 36, 36. This axis also passes substantially through the center of gravity of said supporting frame 30 and the parts attached thereto, including inclined idler rollers 31, 31. As a consequence, even though the conveyor is employed on a steep sloping mine floor, the frame 30 will be substantially in balance at all times.

It is furthermore to be noted that the horizontal axis which passes through the bolts 36, 36 also intersects the axes of the shafts 34, 34 at a position adjacent the bottoms of the rollers 31, 31. As a consequence, any pivotal movement of the frame 30 about the axis of bolts 36, 36 will not produce any appreciable lateral movement of the lower ends of the rollers 31, 31 but will produce lateral movement of the upper ends of said rollers. This is clearly seen by reference to the dotted lines illustrating the movement of the rollers 31, 31 in Fig. 5 of the drawings.

As clearly illustrated in Fig. 6 of the drawings, the supporting frame 30 is placed near the channel 22 and near the brackets 39. As a consequence, the pivotal movement of said supporting frame 30 is restricted in both a clockwise and a counter-clockwise direction as it will strike the channel 22 or the bracket 39 after movement through a few degrees. In practice I have made the maximum allowable movement approximately four degrees in both a clockwise and counter-clockwise direction from a normal upright position which would be determined by a plane passing through the normal axes of rotation of the inclined idler rollers 31 and the axis of the bolts 36.

In the operation of the device comprising my invention, the reversible electric motor 15 will normally be operated to cause the upper run of the belt to progress toward the head pulley 13. The upper run of the belt will be supported by the inclined idler rollers 31, 31 and the horizontal roller 38 to form a trough. The lower run will be supported by the flat idler roller 27.

In the travel of the upper run of the belt 18 toward the head pulley 13 the friction of said belt will rotate the supporting frame 30 about the horizontal axis of the bolts 36 in a counter-clockwise direction through a relatively small angle, as illustrated in Fig. 5 of the drawings. This will tend to move the upper ends of the inclined idler rollers 31 to the left, as viewed in Figs. 1, 2 and 5, which will operate to maintain the upper run of the belt 18 properly centered or in proper alignment. This is due to the fact that the movement of the upper end of each roller 31 will be greater than the movement of the lower end thereof in the direction of travel of the upper run of belt 18. As a consequence, the axes of the rollers 31 will form arcuate angles with the normal plane of said rollers 31. By virtue of this fact there will be a frictional component between each roller 31 and the contacting surface of the belt 18 tending to move said belt 18 towards the center line position. Should the belt 18 become out of alignment it will be evident that there will be a greater contact between said belt and one of the rollers 31 than between said belt and the other roller 31. The roller having the greater contact will consequently have the greater frictional force tending to center said belt 18 which will, of course, operate to this end.

In other words when the unit including the supplemental frame 30 and the parts carried thereby, tilts forward in the direction of the travel of the belt the upper outer ends of the idlers 31, 31 will be moved through larger arcs than the lower ends and the idlers 31 then tend to effect movement of the belt toward the center line of the main conveyor frame 20, 23, 28. The inward rolling tendency will be greater for that idler 31 which has the greater rolling contact with the belt 18. But when the belt is automatically centered it will be automatically kept so by the tilted frame 30 maintaining the idlers 31, 31 in their automatic opposing and belt centering positions. It is important to note that this automatic action is effective for both directions of travel of the belt and whether the main conveyor frame is on up or down grade or on the level, because under these various conditions the travel of the belt in either direction will effect automatic limited tilting of the centering unit relative to the main conveyor frame.

Should the direction of travel of the belt 18 be reversed for any reason, the frame 30 will swing in a clockwise direction and thus will operate through the rollers 31 to maintain the belt 18 in proper alignment during this reverse travel. It is thus obvious that the belt centering device, comprising my invention, is operative to maintain the belt 18 in proper alignment regardless of the direction of travel thereof.

As before mentioned, due to the counter-balance condition of the frame 30 and the elements carried thereby, it will operate as well on an inclined as on a horizontal floor.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a conveyor, the combination with a main frame, of a reversible belt thereon, means for maintaining said belt in alignment during travel in either direction including an idler supporting frame, belt troughing idler means on said supporting frame, means mounting said supporting frame for free but limited pivotal movement on said main frame about a fixed horizontal axis passing below the belt and in both clockwise and counter-clockwise directions from a plane passing through the normal axis of rotation of the troughing idler means and the pivotal axis, and means for balancing said supporting frame and the elements carried thereby on said horizontal axis.

2. A belt centering device adapted to center a belt for both forward and reverse directions of travel comprising a frame, trough forming belt supporting idler means, means supporting said idler means on said frame for free pivotal movement on a horizontal axis passing below the lowermost point of belt support, and means to balance said supporting means on said axis.

3. A conveyor comprising a supporting frame, of a transverse cross-piece on said frame, a belt centering device comprising a tiltable supplemental frame carrying inclined idlers, means for tiltably mounting said belt centering device on said cross-piece, and an idler mounted on said cross-piece for rotation on a fixed axis extending transversely of said supporting frame.

4. A two way belt centering device comprising a main frame, a supplemental frame pivoted thereto on a horizontal transverse axis, centering weights on the lower side of said supplemental frame, and idlers on said supplemental frame rotatable on upwardly and laterally inclined axes.

5. A two-way belt centering device comprising a main frame, a supplemental frame pivoted thereto on a horizontal transverse axis, counterbalancing weights secured to the underside of said supplemental frame, and upwardly and outwardly inclined troughing idlers mounted on the lateral end portions of said supplemental frame and forming with said supplemental frame and said weights a belt troughing unit through whose center of gravity said horizontal axis extends.

6. A belt centering device comprising a main frame, of a supplemental frame pivoted thereto on a transverse axis, counterbalancing weights secured to said supplemental frame, and upwardly and outwardly inclined troughing idlers mounted on the lateral end portions of said supplemental frame and forming with the latter and said weights a belt troughing unit through whose center of gravity said transverse axis extends.

7. In a belt conveyor, the combination with a main frame, of a center idler mounted thereon for rotation relatively thereto on a fixed horizontal transverse axis, a troughing unit comprising upwardly and outwardly inclined idlers mounted on a tiltable supplemental frame to move as a unit therewith, and mechanism for tiltably supporting said supplemental frame on a fixed horizontal transverse axis adjacent to said first-named horizontal axis.

8. In a belt conveyor, the combination with a main frame having a cross-piece, of a center idler mounted on said cross-piece for rotation relatively thereto on a fixed horizontal transverse axis, a troughing unit comprising upwardly and outwardly inclined idlers mounted on a tiltable supplemental frame, counterbalancing weights for the unit, and mechanism for tiltably supporting the said unit on a fixed horizontal transverse axis adjacent and parallel to said first-named horizontal axis with said weights in position to abut against said cross-piece to limit the extent of tilting of said unit relative to the main frame.

9. As an article of manufacture, a balanced unit comprising a frame, troughing idlers mounted on the end portions of said frame, counterbalancing weights secured to said frame, and means affording pivotal connections of said frame to a support with the axis of pivotal movement of the unit extending approximately through the center of gravity of the unit.

10. In a conveyor, the combination with a main frame, of a belt supporting idler on a horizontal transverse axis, inclined belt troughing idlers, mechanism comprising a supplemental frame for supporting said inclined idlers adjacent to said first-named idler, mechanism for supporting said supplemental frame on said main frame for limited tilting movement relatively thereto on a transverse axis, and counterbalancing means on said supplemental frame for extending such transverse axis approximately through the center of gravity of the unit comprising the supplemental frame and the troughing idlers with the counterbalancing means connected thereto.

11. In a conveyor, the combination with a main frame, of a continuous belt thereon, means for driving said belt in reverse directions, means for maintaining said belt in alignment during reverse movements comprising an idler supporting frame, a supplemental frame mounted on said supporting frame for free pivotal movement on a horizontal axis through limited arcs to opposite sides of an upright plane, inclined belt supporting idlers on said supplemental frame, means substantially balancing said supplemental frame on its pivotal axis, said horizontal axis passing slightly below the lowest point of support of said belt on said inclined idlers.

JOHN S. WOOD.